Figure 1:
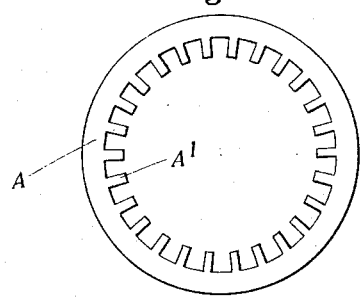

June 1, 1943.　　　　C. B. WILSON　　　　2,320,541

COMMUTATOR FOR DYNAMO-ELECTRIC MACHINES

Filed April 10, 1941

INVENTOR
Cecil Burnham Wilson
BY
Harry S. Dumaree
ATTORNEY

Patented June 1, 1943

2,320,541

UNITED STATES PATENT OFFICE 2,320,541

COMMUTATOR FOR DYNAMOELECTRIC MACHINES

Cecil Burnham Wilson, Greenford, England, assignor to The Hoover Company, North Canton, Ohio, a corporation of Ohio Application April 10, 1941, Serial No. 387,847
In Great Britain May 30, 1940

10 Claims. (Cl. 171—320)

This invention relates to commutators for dynamo-electric machines of the kind in which the commutator segments are embedded in a mass of moulded insulating material.

Hitherto these segments, or the ring from which they are subsequently cut, have been provided with inwardly projecting ribs or tongues which extended radially into the insulating material, and in some cases the ribs, when seen in side elevation or in vertical section, have been of dove-tail shape to furnish a better anchorage for the moulded material. When however the commutator is of small dimensions and in particular if it is provided with a large number of segments, it is found that a satisfactory anchorage for the ribs cannot be obtained if they are of dove-tail shape or if, as an alternative, the ends of the commutator segments are turned inwards. Further, even if it were practicable to form very closely spaced ribs or separating grooves of dove-tail cross-section, a proper union between them and the moulding material cannot be ensured.

The object of the present invention is to provide an improved construction of commutator of the above general type and improved methods by which such commutators can be manufactured.

According to the present invention the ribs or tongues which extend inwardly from the commutator segments are distorted so that they are not radial to the commutator ring. Preferably all the ribs or tongues are distorted in the same manner so that the tongues are all of similar shape, and in a convenient construction each rib or tongue is bent or distorted in opposite directions over different portions of its length. Thus for one half of its length each rib is bent in one direction away from a true radius and the remaining half of its length is bent in the opposite direction. Hence when seen in plan, the rib is, in effect, of Y-shape since over one half of its length, for example the upper half, it inclines in one direction whereas the lower half is inclined in the opposite direction. This enables the segment to be properly anchored in the moulding material without so restricting the spaces between individual ribs or tongues as to prevent the proper flow of the moulding material, as is apt to occur if either the spaces between the ribs or the ribs themselves are of dove-tail cross-section or otherwise provided with constricted spaces.

The method of making a commutator of the kind above described consists in forming a ring having a number of inwardly projecting tongues or ribs, distorting these ribs so that they are no longer truly radial to the ring or circle and then embedding the ring with the ribs so distorted or bent in a mass of moulding material. After the moulding operation, the ring is slotted in a direction parallel to the axis between the anchoring ribs, the number of segments being only limited by the number of projecting ribs.

Figure 2:
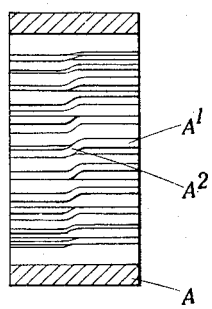
Figure 3:
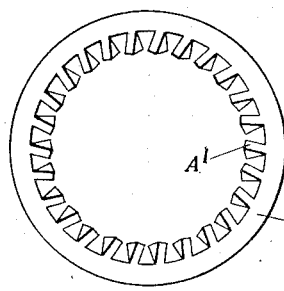
Figure 4:
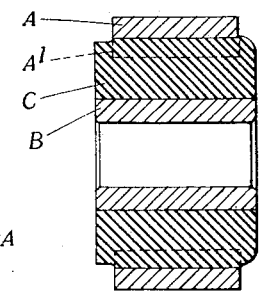
Figure 5:
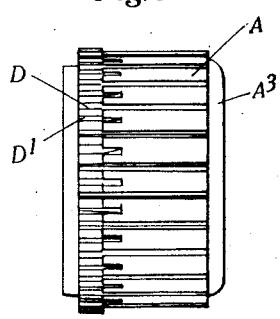
Figures 6, 7:
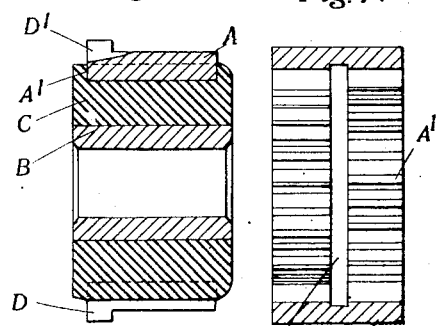

One construction of commutator made in accordance with the present invention is illustrated by way of example in the accompanying drawing, in which Figure 1 is an end view of a ring provided with inwardly projecting radial tongues, Figure 2 is a vertical section of the ring after the tongues have been distorted, Figure 3 is an end view of Figure 2, Figure 4 is a vertical section after the core and ribs have been united by moulding material, Figure 5 is a side elevation of the completed commutator, Figure 6 is a vertical section through the completed commutator, and Figure 7 is a vertical section, showing a modified form of ring with a central groove.

In the example illustrated a ring A is formed by bending a flat metal bar into the circular shape shown and then forming a number of inwardly projecting radial ribs or tongues A1 by means of a broaching operation. After the ring and ribs have been so formed, a tool is inserted into each end of the ring A to engage all the ribs for one half of their length. Both tools are then turned in opposite directions so that each rib is distorted in the opposite sense over one half of its length to assume the shape shown in Figures 2 and 3. Hence when the ring is seen in plan or end view as in Figure 3 the rib is, in effect, of Y-shape and when the ring is viewed in vertical section each half of the rib is seen to have a bent central connecting portion A2 as shown in Figure 2.

After the ribs of the ring have been so distorted, the ring A is placed in a mould adapted to support not only the ring but also a central metal core B, the exterior of which may be knurled and provided with one or more circumferential grooves if desired. A thermo-setting material indicated at C in Figure 4 is placed in the mould and the whole is subjected to heat and pressure so that the ribs A1 are embedded in the moulding material C which is simultaneously securely anchored to the ring A and the central core B.

After the moulding operation is completed, any moulding material is cleaned off the outer surface of the ring A, as by turning, and the external diameter of the ring is reduced over the major portion of its surface so as to leave a projecting riser or flange D at one side of the ring. The ring and the flange are then slotted as shown in Figure 5 in a direction parallel to the longer axis of the ring to form the desired number of individual segments A³, each with an integral riser or flange D, and finally the individual flanges D are provided with central slits D¹ to receive the conductors which are eventually soldered thereto.

Although in the example above described the ring is formed from a flat bar which is provided with projecting tongues or ribs after being bent into a circle, if desired the ring may be formed from a tube. Alternatively, a flat bar may be provided with ribs as by a milling operation before it is bent into a circle. Further, the bar, before it is bent into a circle, may be provided with one or more longitudinal grooves so that the ribs which are formed by transversely slotting the bar or by broaching the ring may be in two or more parts. If the ring is provided with a single central groove A⁴, as shown in Figure 7, the two halves of each complete tongue, after distortion, will be separate instead of being of the dog-legged shape illustrated in Figure 2.

Although, in the particular example above described, the ribs are distorted so that each is approximately tangential to the shaft on which the commutator is subsequently mounted, it will be understood that these ribs may be distorted in some other manner either before or after the ring is formed so that they are no longer truly radial to the ring and thus ensure a good anchorage for the moulding material without unduly restricting the passages or spaces into which the moulding material has to flow.

What I claim as my invention and desire to secure by Letters Patent is:

1. A commutator for dynamo-electric machines comprising a mass of moulding material, a ring of commutator segments embedded therein, each segment having a rib extending inwardly into the mass, each of said ribs having portions thereof laterally offset with respect to each other in different sections of the length of each of said segments.

2. A commutator for dynamo-electric machines as claimed in claim 1 in which each rib is distorted in an opposite direction over different portions in its length.

3. A commutator for dynamo-electric machines as claimed in claim 1 in which for one portion of its length each rib is bent in one direction away from a true radius and is bent in the opposite direction for the remaining portion of its length.

4. A method of manufacturing a commutator for a dynamo-electric machine which consists in forming a metal ring having a number of inwardly projecting radial ribs, laterally offsetting portions of each rib in different sections of the length of said rib, and then embedding the ribs in a mass of moulding material.

5. A method of manufacturing a commutator for a dynamo-electric machine which consists in forming a metal ring with a number of inwardly projecting radial ribs, inserting a tool into each end of the ring so that each tool engages all the ribs for approximately half their length, then turning the tools in opposite directions to distort the ribs so that they are all similar in shape but no longer radial to the ring, embedding the ribs so distorted in a mass of insulating moulding material and subsequently, after the moulding material has set, slotting the ring between the ribs to form separate commutator segments.

6. The method of manufacturing a commutator as claimed in claim 5 which includes the preliminary step of bending a flat metal bar into a ring prior to the distortion of the ribs.

7. The method of manufacturing a commutator for a dynamo-electric machine as claimed in claim 5 which includes the step of forming an internal peripheral groove in the ring so that each rib is divided into two separate parts prior to being distorted and embedded in the insulating mass.

8. The method of manufacturing a commutator for a dynamo-electric machine which consists in forming a number of inwardly projecting radial ribs in a ring by means of a broaching operation, inserting a tool into each end of the ring so that each tool engages all the ribs for approximately half their length, then turning the tools in opposite directions to distort the ribs so that they are all similar but no longer radial to the ring, embedding the ribs so distorted in a mass of insulating moulding material and subsequently slotting the ring between the ribs to form the separate segments.

9. A commutator for dynamo-electric machines comprising a hub, a ring of commutator segments each having a rib embedded in said hub, each of said ribs being disconnected to form rib-sections in the length of each commutator segment, said rib sections for each commutator segment being distorted.

10. A commutator for dynamo-electric machines comprising a hub, a ring of commutator segments each having a rib embedded in said hub, each of said ribs being twisted in the length of the commutator segment.

CECIL BURNHAM WILSON.